W. W. ANNABLE.
SHOCK ABSORBER.
APPLICATION FILED MAR. 4, 1915.

1,181,103.

Patented May 2, 1916.

Inventor
Warren W. Annable

Witnesses
Howard H. Yarrington
Marie York

By Moulton & Livrance
Attorneys

ABLE, OF GRAND RAPIDS, MICHIGAN.

SHOCK-ABSORBER.

1,181,103.

Specification of Letters Patent.   Patented May 2, 1916.

Application filed March 4, 1915.   Serial No. 12,049.

*To all whom it may concern:*

Be it known that I, WARREN W. ANNABLE, a citizen of the United States of America, residing at Grand Rapids, in the county of Kent and State of Michigan, have invented certain new and useful Improvements in Shock-Absorbers; and I do hereby declare the following to be a full, clear, and exact description of the invention, such as will enable others skilled in the art to which it appertains to make and use the same.

This invention relates to a shock absorber adapted to be applied to vehicle springs.

This invention has especial application to springs of automobiles, being interposed between the ends of a spring lying transversely of the body of the automobile and connected to the supporting brackets which, in the usual mounting of said springs, have a link connection therebetween and the ends of the spring.

It is the object and purpose of this invention to construct a shock absorber and apply it to springs in such manner that the normal tendency thereof is to draw the ends of the spring toward each other, thereby serving to camber and stiffen the central portion of the spring. Upon the spring being subjected to shocks the first effect is that the ends of the spring are carried outwardly away from each other, the shock absorber acting against this operation. This will tend to relieve the spring and at the same time will furnish an auxiliary cushioning device adapted to take up and receive the first shock to which springs in vehicles are continuously subjected during the operation thereof.

My invention also is of great utility in preventing side sway of the body of the vehicle which usually occurs to a marked extent with springs mounted in the manner above noted.

Further objects and purposes will be made clear upon understanding being had of the embodiment disclosed in the accompanying drawing in which:—

Figure 1:
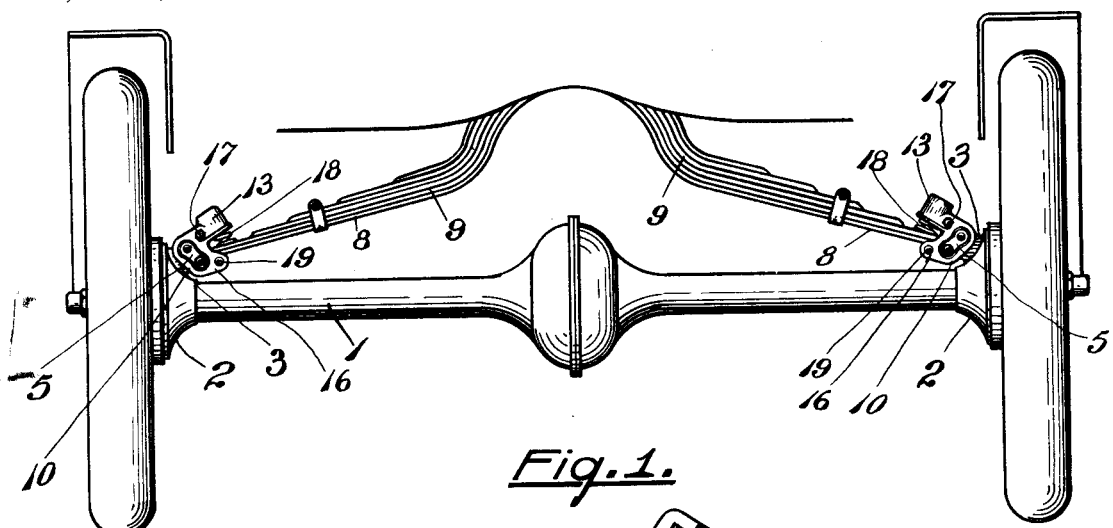
Figure 2:
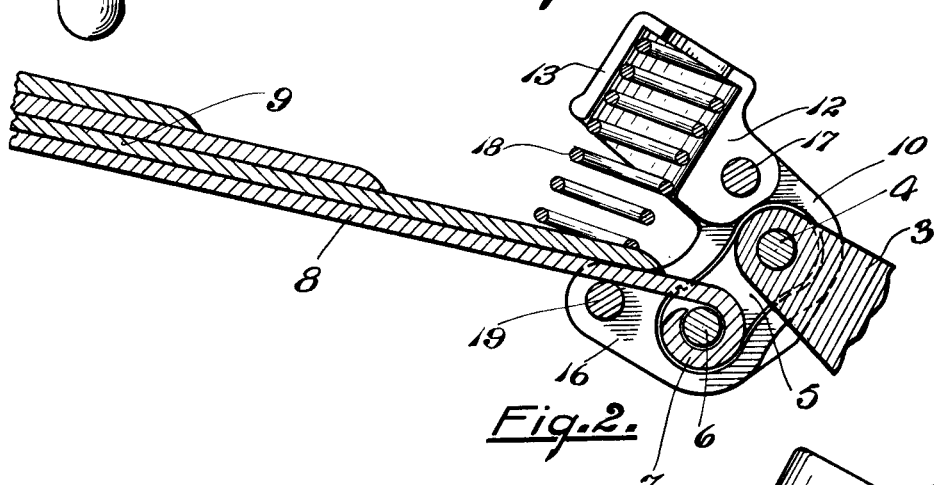
Figure 3:
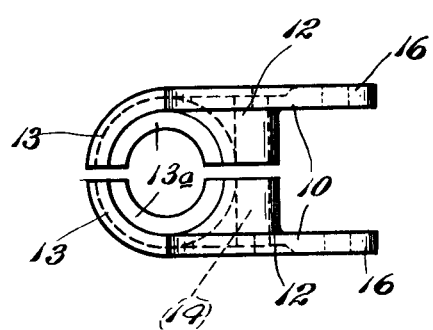
Figure 4:
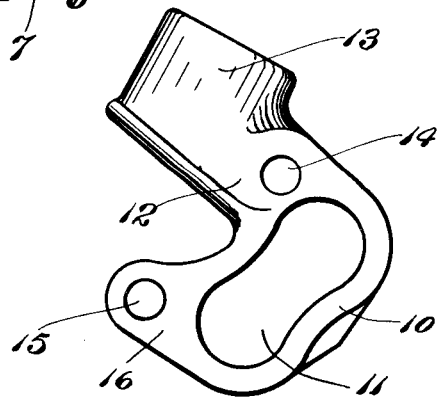

Figure 1 is an elevation showing an automobile spring equipped at each end with my improved shock absorber. Fig. 2 is a vertical sectional view taken through one end of the spring and the shock absorber connected therewith. Fig. 3 is a bottom plan view of the two housing members used to retain the spring of the shock absorber; and Fig. 4 is an enlarged side elevation of a housing member.

Like reference characters refer to like parts throughout the several views of the drawings.

In the embodiment shown in the drawings casing 1 inclosing the rear axle of an automobile has at each end hub casings 2 of the usual construction from which project brackets 3 each having a pin 4 at its upper end extending horizontally therethrough and supporting a pair of links 5. These links extend downwardly and inwardly and at their lower ends carry a pin 6 around which is turned the loop 7 of the lower leaf 8 of a leaf spring 9 which lies above the axle substantially the full length thereof. The body of the automobile is supported at its front and rear by transverse springs of this or similar type and the construction described is a common and well known construction used in connecting the springs supporting the body to the running gear of the vehicle.

In my shock absorber there are provided a pair of housing members at each end of the spring. Each housing member includes a body 10 in which an elongated opening 11 is formed of a size and shape adapted to receive one of the links 5. At its upper end body 10 is extended upwardly and inwardly and made considerably thicker as indicated at 12 being thereafter formed into a semi-cylindrical cap 13 provided with a top 13ᵃ as shown. A transverse opening 14 is made through the thickened section 12 and a similar opening 15 is made through the inwardly extending projection 16 formed at the lower end of the body 10. In applying the shock absorber to a vehicle spring two of these housing members are used and positioned one over each link 5. The openings 14 of the two members thereupon are in alinement and a bolt 17 may be inserted to secure the housing members firmly in position. The device as a whole may now be turned on this bolt 17 serving to elevate the parts 13 permitting the insertion of a strong coil spring 18 between the top 13ᵃ and the upper surface of the leaf spring 9. After the spring is inserted the device as a whole is rotated downwardly about the bolt 17 until openings 15 are positioned below the lower leaf 8 of the spring and then a bolt 19 is inserted through said openings and secured in place. This bolt under the influence of spring 18 normally bears against the under surface of the leaf 8 and the spring 18 is under compression.

Spring 18 is of great strength and its tendency under compression is to force the cap which houses it away from the spring 9, turning the links 5 on the pin 4 and forcing the lower ends thereof inwardly. With a device of this character applied at each end of a spring it will be evident that there is a continual pressure exerted by the coil springs 18 tending to bring the ends of spring 9 toward each other to elevate and stiffen the middle portion of said spring. At the same time there is a horizontal component to the spring 18 acting against any side sway of the spring 9 and the body carried thereby, the links 5 being impelled inwardly at their lower ends by springs 18 which tend to resist any outward swing of the lower ends of said links which must take place in the case of side sway.

A line drawn between the ends of the links 5 will lie at approximately 45 degrees to the vertical. As the vehicle is carried over roads the shocks to which the spring 9 is subjected first result in the outward movement of the ends of the springs and a corresponding compression of the spring 18. If the compression of the coil springs 18 is sufficiently great the lower edges of the caps containing the springs will come into contact with the upper sides of the spring 9 after which the vehicle spring 9 will act as though the attached shock absorber was not present but upon return after the shock the caps containing the coil springs 18 occupy their normal positions holding the links 5 in normal position to the vertical.

After vehicle springs of the character shown have been used for some time the links carrying them gradually approach a nearly vertical position and take such position when a shock is transmitted to the spring. The spring thereupon becomes "dead" and does not have resiliency to properly take care of the shock. When equipped with my invention the links supporting the ends of the spring are always maintained at an angle to the vertical insuring against any deadening effect before noted.

The construction described is simple and easily manufactured. It is easily applied to springs of this type without disassembling any parts of the vehicle. The housing parts slip over the links and are readily connected together by the bolts 17 and 19 as heretofore described making an especially convenient and easy attachment of the shock absorber to the vehicle spring.

Various modifications in detail may be resorted to without departing from the invention defined in the appended claims and all modifications falling within the scope of said claims are to be considered as comprehended within my invention.

I claim:—

1. In combination, a support, spaced apart links depending from the support, a leaf spring carried at one end by and between the lower ends of the links, housing members positioned one over each link, means connecting the members together above the leaf spring, means connecting the members together below the leaf spring and a coil spring under compression interposed between the upper side of the leaf spring and the connected housing members, substantially as described.

2. In combination, a support, spaced apart links depending from the support, a leaf spring carried at one end by and between the lower ends of the links, housing members each including a body having an elongated opening positioned one at either side of the leaf spring, the links passing through said openings, a semi-cylindrical extension to each housing member extending over the leaf spring, means for connecting the housing members together above the leaf spring, a bolt lying below the leaf spring and connecting the housing members, and a coil spring positioned between the upper side of the leaf spring and the cap formed by the semi-cylindrical extensions, substantially as described.

3. An article of manufacture comprising a body having an elongated opening therein, an extension to the body projecting from one of its ends and terminating in a semi-cylindrical housing member, and an extension projecting from the other end of the body in the same direction as the first extension, transverse openings being provided in both extensions, substantially as described.

4. In combination, a leaf spring, supports at either end thereof, links connected to and lying between the ends of the spring and the supports, a coil spring bearing against the upper side of the leaf spring at each end, and a housing for the spring carried by the links and provided with means for forcing the said coil springs against the leaf spring, substantially as described.

5. In combination spaced apart supporting brackets, a leaf spring lying between the brackets, a coil spring on the upper side of the leaf spring at each end thereof, a housing for each coil spring, a pair of spaced apart body members connected to each housing and interposed between each support and the adjacent end of the leaf spring, an inwardly extending projection to each body member, and a member connecting the extensions, said member passing below the leaf spring.

6. In combination, a leaf spring, supports at either end thereof, links connected to and lying between the ends of the opening and the supports, and means located above each end of the spring connected with the links and tending to force the lower ends thereof inwardly, to camber the leaf spring, substantially as described.

7. In combination, a leaf spring, supports at either end thereof, a coil spring on the upper side of the leaf spring at each end thereof, a housing for each spring, and a pair of spaced apart body members connected to each housing and interposed between each support and the ends of the leaf spring, substantially as described.

In testimony whereof I affix my signature in presence of two witnesses.

WARREN W. ANNABLE.

Witnesses:
FRANK E. LIVERANCE, Jr.,
H. H. YARRINGTON.